(12) United States Patent
Fischer et al.

(10) Patent No.: US 9,050,941 B2
(45) Date of Patent: Jun. 9, 2015

(54) TENSIONING DEVICE FOR A SAFETY BELT

(75) Inventors: Christian Fischer, Hamburg (DE);
Martin Schmidt, Elmshorn (DE);
Matthias Steinberg, Kiebitzreihe (DE);
Michael Pech, Hamburg (DE); Tobias Voss, Klein Nordende (DE); Thomas Schmidt, Timmendorfer Strand (DE);
Simone Mesecke-Rischmann, Hamburg (DE)

(73) Assignee: AUTOLIV DEVELOPMENT AB, Vårgårda (SE)

( * ) Notice: Subject to any disclaimer, the term of this patent is extended or adjusted under 35 U.S.C. 154(b) by 456 days.

(21) Appl. No.: 13/505,164

(22) PCT Filed: Oct. 12, 2010

(86) PCT No.: PCT/EP2010/006227
§ 371 (c)(1),
(2), (4) Date: Apr. 30, 2012

(87) PCT Pub. No.: WO2011/050904
PCT Pub. Date: May 5, 2011

(65) Prior Publication Data
US 2012/0211578 A1 Aug. 23, 2012

(30) Foreign Application Priority Data
Oct. 30, 2009 (DE) ............ 10 2009 051 451

(51) Int. Cl.
*B65H 75/48* (2006.01)
*B60R 22/195* (2006.01)
*B60R 22/46* (2006.01)

(52) U.S. Cl.
CPC ......... *B60R 22/1954* (2013.01); *B60R 22/4628* (2013.01); *B60R 2022/4642* (2013.01)

(58) Field of Classification Search
USPC .................. 242/374; 60/632–638
See application file for complete search history.

(56) References Cited

U.S. PATENT DOCUMENTS

| 2,441,719 | A | 5/1948 | Potter |
| 3,304,878 | A | 2/1967 | Sabre |

(Continued)

FOREIGN PATENT DOCUMENTS

| DE | 29 31 164 A | 2/1981 |
| DE | 195 45 795 C1 | 3/1997 |

(Continued)

OTHER PUBLICATIONS

PCT International Search Report—Jan. 11, 2011.

(Continued)

*Primary Examiner* — Emmanuel M Marcelo
*Assistant Examiner* — Angela Caligiuri
(74) *Attorney, Agent, or Firm* — Brinks Gilson & Lione

(57) ABSTRACT

A tensioning device (10) for a seat belt, in particular in a motor vehicle, having a gas generator (17) and a piston (21) guided in a tube (16) that closes a pressure space (20) in the tube (16), whereas the pressure space (20) can be pressurized by the gas generator (17), as a result of which the piston (21) can be driven to perform a tensioning operation which can be transmitted to the seat belt by means of the force transmission means. The piston (21) having a closed or constricted opening (1, 1*a*), and the opening (1, 1*a*) can be enlarged and/or opened by the material erosion caused by the pressure and/or pressure conditions in the pressure space (20).

11 Claims, 3 Drawing Sheets

(56) References Cited

U.S. PATENT DOCUMENTS

| | | | |
|---|---|---|---|
| 3,965,802 A | 6/1976 | Jacobs | |
| 4,399,655 A | 8/1983 | Föhl | |
| 4,442,674 A | 4/1984 | Fohl | |
| 4,444,010 A * | 4/1984 | Bendler | 60/407 |
| 4,860,698 A | 8/1989 | Patrichi et al. | |
| 5,037,134 A | 8/1991 | Tabata | |
| 5,641,131 A | 6/1997 | Schmid et al. | |
| 5,690,295 A | 11/1997 | Steinberg et al. | |
| 5,842,344 A | 12/1998 | Schmid | |
| 5,956,954 A | 9/1999 | Schmid | |
| 6,325,416 B1 | 12/2001 | Wier | |
| 6,343,758 B1 | 2/2002 | Abe et al. | |
| 6,345,504 B1 | 2/2002 | Takehara et al. | |
| 6,363,722 B1 | 4/2002 | Takehara et al. | |
| 6,371,512 B1 | 4/2002 | Asano et al. | |
| 6,446,897 B1 | 9/2002 | Arima et al. | |
| 6,450,435 B2 | 9/2002 | Junker et al. | |
| 6,450,529 B1 | 9/2002 | Kalandek et al. | |
| 6,481,743 B1 | 11/2002 | Tobe et al. | |
| 6,575,498 B2 | 6/2003 | Nagata et al. | |
| 6,722,600 B2 | 4/2004 | Hamaue et al. | |
| 6,808,199 B2 | 10/2004 | Saderholm et al. | |
| 6,830,262 B2 | 12/2004 | Sonnenberg et al. | |
| 6,910,653 B2 | 6/2005 | Tanji | |
| 7,401,805 B2 | 7/2008 | Coon et al. | |
| 7,661,705 B2 | 2/2010 | Jacobsson et al. | |
| 7,770,918 B2 | 8/2010 | Berntsson et al. | |
| 8,210,569 B2 | 7/2012 | Eberle et al. | |
| 8,262,008 B2 | 9/2012 | Shiotani et al. | |
| 8,371,613 B2 | 2/2013 | Hodatsu et al. | |
| 8,684,413 B2 | 4/2014 | Fischer et al. | |
| 2002/0134876 A1 * | 9/2002 | Ono et al. | 242/374 |
| 2002/0180190 A1 | 12/2002 | Tobe et al. | |
| 2003/0010200 A1 | 1/2003 | Reithofer | |
| 2004/0007857 A1 | 1/2004 | Sonnenberg et al. | |
| 2006/0119084 A1 | 6/2006 | Coon et al. | |
| 2006/0197316 A1 | 9/2006 | Watanabe | |
| 2006/0213191 A1 | 9/2006 | Borg et al. | |
| 2007/0251616 A1 | 11/2007 | Furusawa et al. | |
| 2007/0296189 A1 | 12/2007 | Berntsson et al. | |
| 2011/0140502 A1 | 6/2011 | Shiotani | |
| 2012/0211578 A1 | 8/2012 | Fischer et al. | |
| 2012/0256407 A1 | 10/2012 | Tomita et al. | |
| 2013/0038047 A1 | 2/2013 | Schmidt et al. | |
| 2013/0062450 A1 | 3/2013 | Fischer et al. | |

FOREIGN PATENT DOCUMENTS

| | | |
|---|---|---|
| DE | 196 02 549 A1 | 8/1998 |
| DE | 198 37 927 A1 | 3/2000 |
| DE | 199 39 499 A1 | 2/2001 |
| DE | 100 27 212 A1 | 12/2001 |
| DE | 102 12 912 A1 | 10/2002 |
| DE | 10331133 | 1/2004 |
| DE | 103 17 192 A1 | 12/2004 |
| DE | 10 2004 024 623 A1 | 12/2005 |
| DE | 10 2004 045 977 A1 | 3/2006 |
| DE | 102005011676 | 11/2006 |
| DE | 100 66 249 B4 | 7/2007 |
| DE | 102007028980 A1 | 1/2009 |
| DE | 102008032371 A1 | 9/2009 |
| DE | 10 2008 053 229 A1 | 5/2010 |
| EP | 0 780 272 A1 | 6/1997 |
| EP | 1286866 | 12/2001 |
| WO | WO 2009/079996 A2 | 7/2009 |

OTHER PUBLICATIONS

German Search Report—Jun. 20, 2010.
German Search Report—DE 10 2009 051 451.1-22—May 19, 2011.
German Search Report—DE 10 2010 018 512.4—Jan. 18, 2011.
PCT/EP2007/008243—Publication with International Search Report—Mar. 6, 2008.
PCT/EP2007/010847—Publication with International Search Report—Mar. 31, 2008.
PCT/EP2008/004644—International Search Report—Dec. 31, 2008.
PCT/EP2010/006227—International Search Report—Jan. 21, 2011.
PCT/EP2010/007051—International Search Report—Mar. 10, 2011.
PCT/EP2011/001057—International Search Report—May 30, 2011.
U.S. Appl. No. 13/669,726, filed Nov. 6, 2012 (Assigned to Applicant).

* cited by examiner

TENSIONING DEVICE FOR A SAFETY BELT

CROSS-REFERENCE TO RELATED APPLICATIONS

This application claims priority to German Patent Application No. 10 2009 051 451.1, filed Oct. 30, 2009 and PCT/EP2010/006227, filed Oct. 12, 2010.

FIELD OF THE INVENTION

The invention relates to a tensioning device for a seat belt, in particular in a motor vehicle.

BACKGROUND OF THE INVENTION

The problem with generic seat belt retractor tensioning devices of the pyrotechnically activated-type is that the pressure conditions during the tensioning operation vary considerably. In particular, very high pressure peaks can damage parts of the tensioning device, or disturb the motion sequences of the tensioning device. Furthermore, the problem is that, unless the safety belt is provided with a force limiting device, the belt force at the start of the force-limited belt extension motion following the tensioning operation increases for a short time to a force limiting level that is higher than that defined by the force limiting device due to the pressure still prevailing in the tensioning device. This effect is generally designated as a force limiting disturbance. In order to prevent these disadvantages resulting from excessive pressure, different solutions have been devised to prevent pressure peaks and reduce the pressure following the tensioning of the safety belt as quickly as possible.

U.S. Pat. No. 6,345,504 describes a tensioning device in which the piston is formed by an elastic ball with a blind opening, and a through-opening is provided in a subsequent ball through which a rod held in the blind opening protrudes. In case of an above-normal pressure, the rod causes the elastic ball to break in order to allow the gas to escape through the gas channel. The production of both the blind opening and the through-opening is expensive and requires a complex assembly process which further increases the price of the tensioning device.

SUMMARY OF THE INVENTION

It is the object of the invention to provide a cost-effective and functionally reliable tensioning device with a high tensioning performance in which excessive gas pressure is reduced in a simple manner.

The object of the invention is attained by a tensioning device with the characteristics described herein. Further preferred embodiments of the invention will be apparent from the figures as well as from the corresponding description.

To attain this object, this invention proposes that the piston of a roto-pretensioner has a closed or constricted opening, and that the opening can be enlarged and/or opened by material wear caused by the pressure and/or the flow conditions in the pressure space.

The advantage of the proposed solution is that the opening is closed or has a constricted cross-section at the start of the tensioning operation so that a high tensioning force can be transmitted at that time. The opening is then opened by the pressure and/or the flow conditions prevailing in the pressure space during the tensioning operation so that the pressure prevailing in the pressure space can escape through the open and/or enlarged opening in the piston. Owing to the open and/or enlarged opening, pressure peaks can be reduced without adversely affecting the tensioning operation and the piston can be moved back in a reverse direction against the tensioning motion after the tensioning operation without again increasing the force-limiting level. According to the present invention, the effect of the material wear or erosion caused by gas flow is used for opening and/or enlarging the opening, with the advantage that during the tensioning operation the free cross-section of the opening is continuously enlarged and/or is still closed at the start of the tensioning operation and only opened during the tensioning operation. It is thus possible to transmit a high tensioning force of the tensioning device at the start of the tensioning operation and reduce the pressure prevailing in the pressure space at the end of the tensioning operation as quickly as possible in order to prevent the destruction of the force limiter. The material wear, also called erosion, is caused by the pressure and/or flow conditions prevailing in the pressure space so that the opening and/or enlargement of the opening is directly activated by the tensioning device itself. In this connection, the nominal size of the opening and/or enlargement of the opening is directly related to the pressure, which ultimately results in the detrimental behavior of the tensioning device in case of an excessive pressure increase. In case the pressure is substantially lower for some reason, that is, the disadvantages described above do not occur, the opening is not opened, or opened to a lesser degree, so that in this case the tensioning force is still not unnecessarily reduced. The effect of the material erosion can also be supported by the prevailing temperature conditions and the particles resulting from the activation of the gas generator.

BRIEF DESCRIPTION OF THE DRAWINGS

The invention will be explained in more detail below by means of a preferred exemplary embodiment. The figures specifically show.

DETAILED DESCRIPTION OF THE INVENTION

Figure 1:
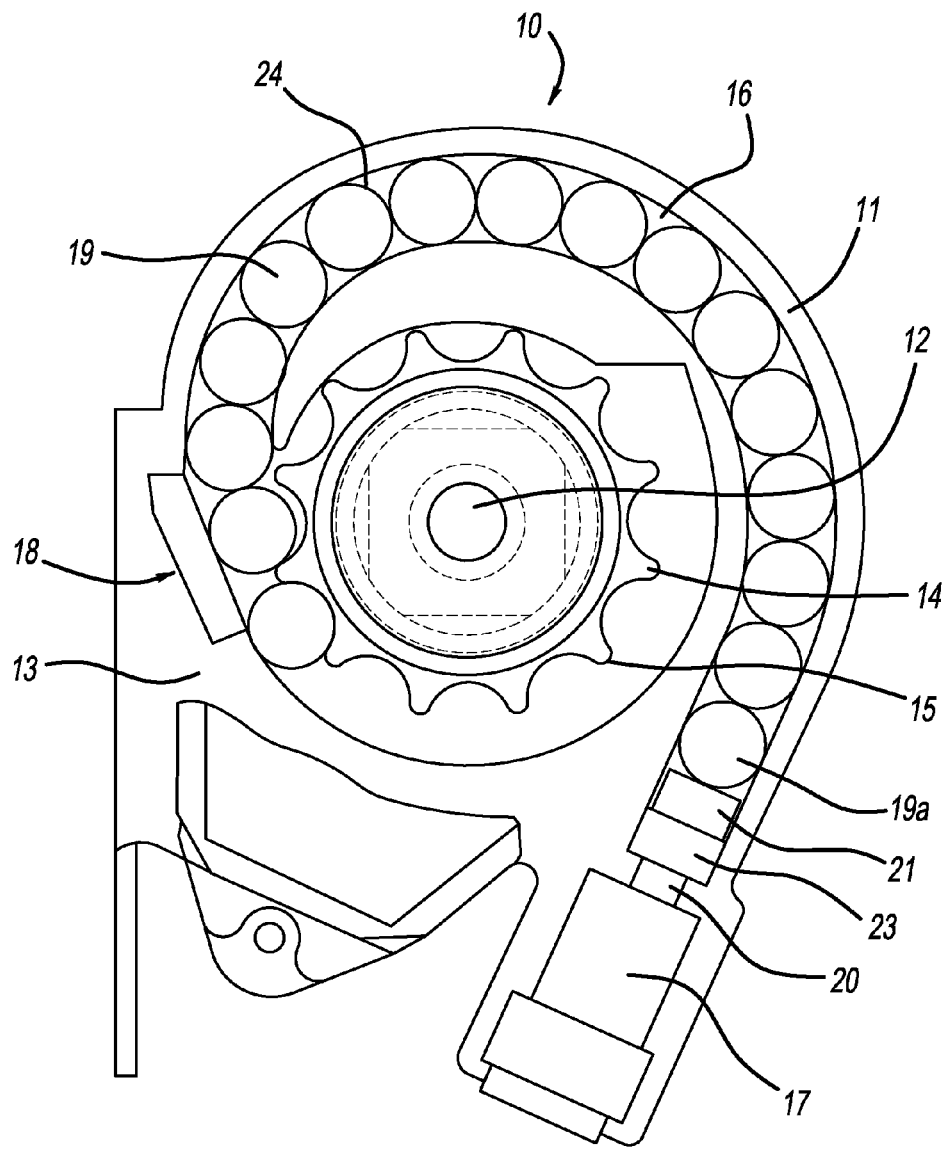
FIG. 1 is a side sectional view of a tensioning device coupled to a belt retractor with a piston guided in a tube in accordance with this invention.

The belt retractor schematically shown in FIG. 1 comprises a housing 11 with a side piece 13, a belt retractor shaft 12 for a seat belt strap, which is not shown, mounted therein and a tensioning device 10 acting on the belt retractor shaft 12 after being activated. The tensioning device 10 comprises a drive wheel 14 connected in a torque transmitting manner to the belt retractor shaft 12, the drive wheel 14 having, for example, external teeth, a pyrotechnical gas generator 17 to generate the gas pressure, and a tube 16 connecting the gas generator 17 to the belt retractor shaft 12 via the drive wheel 14. The tube 16 is formed by a tube wall 24 which is part of the housing 11, or alternatively also by a separate component.

A series of balls 19, preferably made of metal is provided in the tube 16 to transmit the gas pressure generated by the gas generator 17 to the belt retractor shaft 12 via the drive wheel 14. The belt retractor is not restricted with respect to the embodiment of the area of interaction 18 between the series of balls 19 and the drive wheel 14 or with respect to any coupling devices between the drive wheel 14 and the belt retractor shaft 12. The outer diameter of the balls 19 is conveniently slightly smaller than the inner diameter of the tube 16 for low friction force transmission.

A piston 21, which is only schematically indicated in FIG. 1, is provided and is conveniently arranged in an area 23 between the gas generator 17 and the series of balls 19, that is, directly in front of the first ball 19a of the series of balls 19 in the direction of the force transmission. The piston 21 seals a pressure space 20 in the tube 16 which can be pressurized by the gas generator 17 so that it can be driven to a tensioning motion when the pressure space 20 is pressurized by the gas generator 17. The tensioning motion of the piston 21 is transmitted by the force transmission means formed by the balls 19 and the drive wheel 14 to the belt shaft 12 so that the seat belt strap is tensioned. The tensioning device 10 was, for example, described in application to a belt retractor with a force transmission means consisting of a series of balls 19 and a drive wheel 14; other types of force transmission means would, however, also be conceivable, e.g. a rack-and-pinion drive or a cable drive. The invention is virtually applicable to all kinds of tensioning devices whose drive comprises a piston-cylinder drive unit driven by gas pressure. The tensioning device 10 can also be arranged on a belt buckle or on an end fitting of a seat belt.

Figure 2:
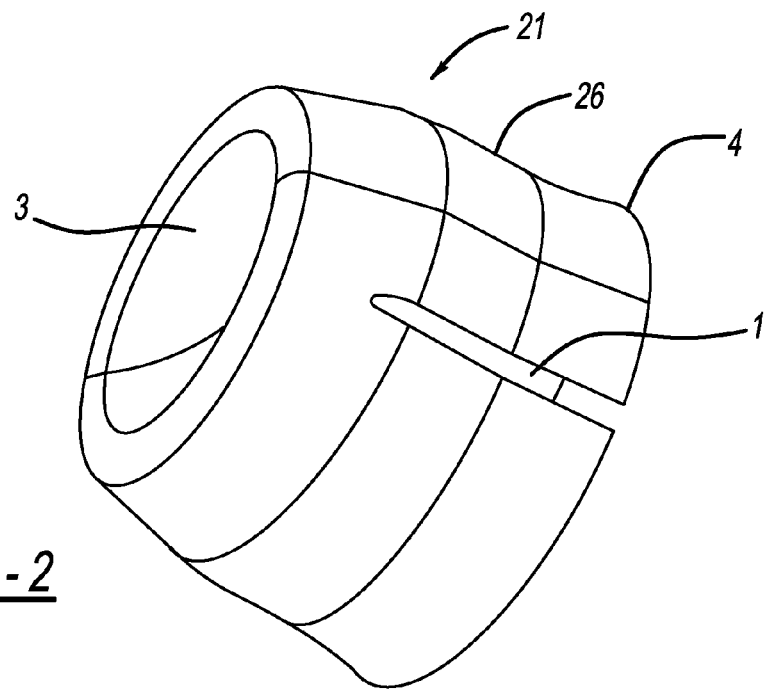
FIG. 2 shows a piston with a notch and an opening arranged on a lateral surface.
Figure 3:
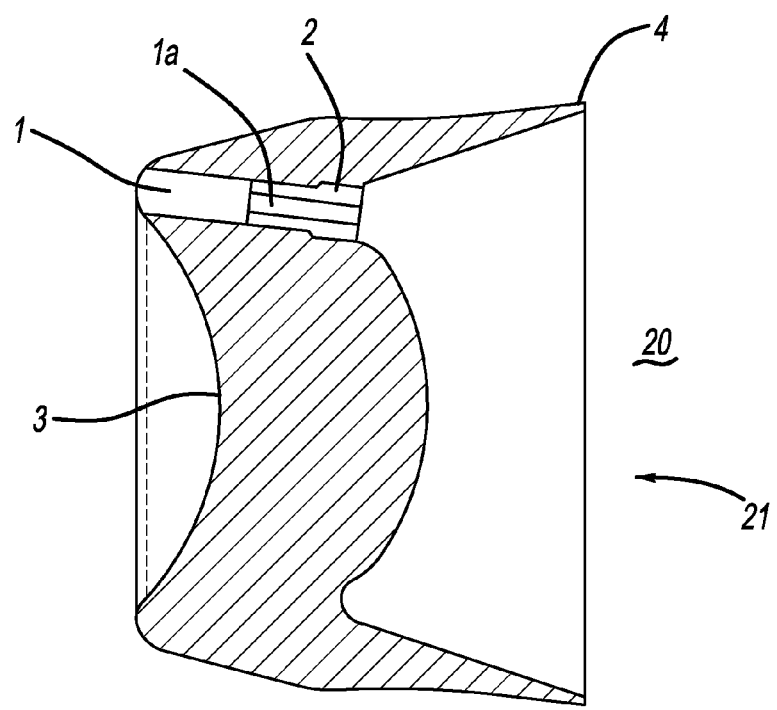
FIG. 3 is a cross-section of the piston with an opening constricted by an insert.

In FIGS. 2 and 3 the piston 21 is respectively shown enlarged in an oblique view and in a cross-section (showing different embodiments). The piston 21 has a dome-shaped front side 3 which serves as a contact surface for the first ball 19a. Starting at the front side 3, the surface of the piston 21 merges into a lateral edge 26 which radially flares outward and finally ends in a circumferential sealing lip 4. Owing to the dome shape of the front side 3, the piston 21 contacts the first ball 19a with a preferably large surface. Furthermore, the piston 21 can be differently oriented with respect to the first ball 19a without losing contact, so that there is a reliable contact of the piston 21 with the first ball 19a even with a bent tube 16 geometry. A cup shape results due to the lateral edge surface 26 flaring radially outward, by means of which the pressure prevailing in the pressure space 20 is in part transformed into an outward radial force acting on the sealing lip 4, such that the piston 21 contacts the inner side of the tube 16 via the sealing lip 4 with an increased sealing action. In FIG. 2, an opening 1 is provided in the lateral edge 26 of the piston 21 in the form of a notch open to the outside. The open side of the notch is again closed due to the edge 26 contacting the inner side of the tube 16, resulting in an opening 1 that is closed or nearly closed in the circumferential direction.

Another possible shape of the opening 1 is shown in FIG. 3, where it is configured as a through-opening. The opening 1 is in FIG. 3 constricted by an insert 2 to an opening 1a with a smaller cross-sectional area.

The above described openings 1 shown in FIGS. 2 and 3 provide a permanent flow path for gases from gas generator 17 to flow around or across the piston 21 which serves to reduce pressure peaks acting on the piston during tensioning operation. The embodiments of openings 1 described in the following description of FIGS. 4a and 4b act to provide a leakage path only when an excessive or "overpressure" condition exists.

Figure 4A:
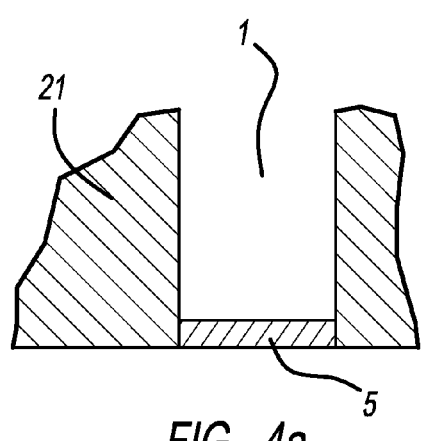
FIG. 4a shows the piston opening with a thin partition across the opening made of a material that is different from that of the piston.
Figure 4B:
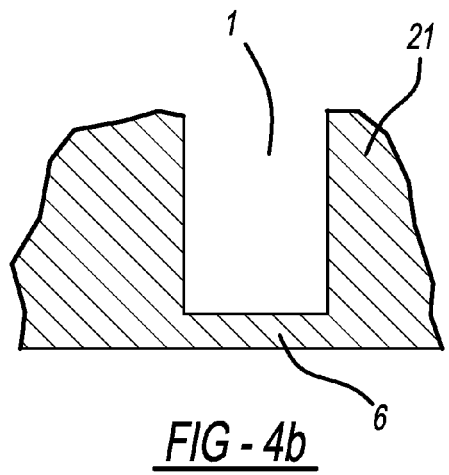
FIG. 4b shows the piston opening with a thin partition across the opening made of a material that is identical with the material of the piston.

Two further alternative embodiments of the invention can be seen in FIGS. 4a and 4b, where the opening 1 is closed by a thin partition 5 and 6, the partition 5 being made of a different material than the piston 21 in the exemplary embodiment shown in FIG. 4a, and being made of a material that is identical to the material of the piston 21 in the exemplary embodiment shown in FIG. 4b. The material of the partitions 5 and 6 closing the opening 1 should be selected according to the material abrasion to be achieved, where the opening process of the opening 1 can be influenced by the material abrasion caused by gas flow and also by the thickness of the partitions 5 and 6.

Figure 5A:
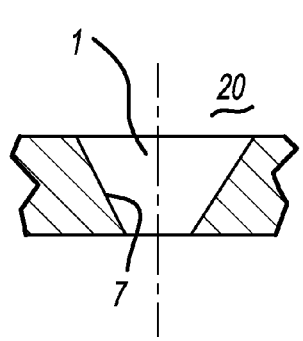
FIG. 5a shows the opening with a conically flared cross-section.
Figure 5B:
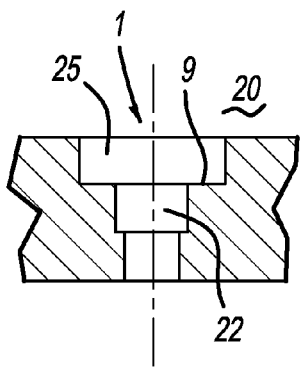
FIG. 5b shows the opening with a cross-section flared by several cylindrical sections having a different diameter.
Figure 5C:
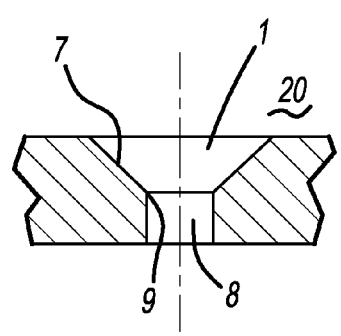
FIG. 5c shows the opening with a cylindrically and a conically flared section.

Whether the opening is closed at the beginning of tensioning operation, as shown in FIGS. 4a and 4b, or permanently open, as shown in FIGS. 2 and 3, different embodiments of the opening 1 with a cross-sectional area decreasing from the pressure space 20 can be seen in FIGS. 5a to 5c. In FIG. 5a, the opening 1 is formed by a tapered cone 7. In the exemplary embodiment of FIG. 5b, the opening 1 is formed by two cylindrical bores 22 and 25 which form a ledge 9 at the junction. An opening 1 can be seen in FIG. 5c which is formed by a combination of a cone 7 and a cylindrical section 8. In these exemplary embodiments the area that is pressurized by the pressure of the pressure space 20 is reduced during the tensioning operation by the cross-sectional area which decreases from the pressure space 20. Owing to this decrease in the cross-sectional area, the material abrasion along the opening 1 aimed at according to the present invention is also enlarged because the speed of the gas flow passing through the opening 1 in the constricted region increases.

A principal feature of the invention is that the opening 1 is opened and/or enlarged by means of the material abrasion owing to the pressure and/or the resulting flow conditions in the pressure space 20. The effect of the material abrasion is attributable to the fact that material is separated from the internal surface of the opening 1 by the pressure and/or flow conditions supported by the temperature and by the particles generated during the activation of the gas generator 17. The effect of the material erosion can be influenced by a conscious choice of the material of piston 21 or by the shape of the opening 1. The opening 1 can be shut off by means of a material such as POM or be constricted by means of a plastic insert 2, whereas the piston 21 can incidentally be made of a harder material. In this case, the effect of the material abrasion is particularly strong in the region of the opening 1, whereas the piston 21 itself is not subject to any significant material abrasion.

Furthermore, the cross-section of the opening 1 can also have a different shape such as square, hexagonal of circular, as a result of which the material abrasion can be modified. The most important parameter for the material abrasion is the flow speed of the hot gases from gas generator 17 along the surface on which the material erosion should occur which can be modified as such by the pressure because it is responsible for the resulting gas flow. The width of an already open opening 1 is also critical because it determines the gas flow speed in the opening 1. In this case, it is possible that owing to a very high flow speed in the opening 1, the material of the opening 1 has to be selected even harder than the piston in order to limit the material abrasion. An example would be a small metal tube which is inserted into the opening.

Unless the opening 1 is already open, or a constricted opening 1a is already available at the start of the tensioning operation, the opening 1 acts as a nozzle, so that the gas available at a high pressure in the pressure space 20 is accelerated when entering the opening 1. Owing to the high flow speed in the opening 1, it is virtually washed out by the gas flow, the high flow speed in the opening 1 causing a high surface stress and abrasion and thus the separation of the parts from the surface of the material, as well as resulting in that the parts are quickly discharged and do not clog the opening 1. The flow in the opening 1 can be accelerated further by the decreasing cross-sectional area of the opening 1. It is also an advantage of the decreasing cross-sectional area that the insert 2 to narrow the opening 1 cannot abruptly be torn off by the gas flow, and thus the opening is not abruptly enlarged.

The proposed measures can also be implemented such that the parameters change during the tensioning operation so that the opening 1 is not continuously enlarged, but only at the end of the tensioning operation.

While the above description constitutes the preferred embodiment of the present invention, it will be appreciated that the invention is susceptible to modification, variation, and change without departing from the proper scope and fair meaning of the accompanying claims.

The invention claimed is:

1. A tensioning device (10) for a seat belt, comprising a gas generator (17), and a piston (21) which is guided in a tube (16) and closes a pressure chamber (20) in the tube (16), wherein the pressure chamber (20) is charged with pressure by the gas generator (17) upon an activation of the gas generator, and wherein the piston (21) by the pressure present in the pressure chamber (20) upon the activation of the gas generator is carried out a tensioning movement through the tube which is transmitted to the seat belt via a force transmitting device, the piston (21) having an opening (1, 1*a*), which is surrounded by such a material that the opening is widened or opened by a material erosion effected by gas flowing from the pressure chamber (20) into the opening during gas discharge by the gas generator the opening being a recess on a radially outer peripheral surface (26) of the piston (21) and extending in the longitudinal direction of the piston.

2. The tensioning device (10) according to claim 1, further comprising that the opening (1, 1*a*) is closed at least partially by a thin-walled separation wall (5, 6).

3. The tensioning device (10) according to claim 1 further comprising that the opening (1, 1*a*) has a cross-sectional area that changes along a longitudinal extension of the piston.

4. The tensioning device (10) according to claim 3, further comprising that the cross-sectional area of the opening (1, 1*a*) diminishes starting from the pressure chamber (20).

5. The tensioning device (10) according to claim 3 further comprising that the cross-sectional area of the opening (1, 1*a*) at least in sections along the longitudinal extension is formed to be conical.

6. The tensioning device (10) according to claim 3 further comprising that the opening (1, 1*a*) in the direction of the longitudinal extension forms a ledge (9).

7. The tensioning device (10) according to claim 1 further comprising that an insert (2) closing up or narrowing the opening (1, 1*a*) is provided in the opening (1, 1*a*).

8. The tensioning device (10) according to claim 1 further comprising that the opening (1, 1*a*) is closed up or narrowed using a material differing from the material of the piston (21), and that there is more removal of the material placed in the opening (1, 1*a*) under the pressure conditions and the flow conditions in the pressure chamber (20) than of the material in the piston (21).

9. The tensioning device (10) according to claim 1 further comprising that the opening (1, 1*a*) is formed by a recess placed in a lateral peripheral surface (26) of the piston (21).

10. The tensioning device of claim 1, wherein the piston has a dome-shaped front side which serves as a contact surface for a first ball of the force transmission device.

11. The tensioning device of claim 1, wherein the piston has an outside surface that merges into a lateral edge, which radially flares outward and ends in a circumferential sealing lip.

* * * * *